United States Patent
Weidmann

(10) Patent No.: US 7,858,713 B2
(45) Date of Patent: Dec. 28, 2010

(54) ACCELERATOR SYSTEMS FOR LOW-TEMPERATURE CURING

(75) Inventor: Ulrich Weidmann, Basel (CH)

(73) Assignee: Huntsman Advanced Materials Americas Inc., The Woodlands, TX (US)

( * ) Notice: Subject to any disclaimer, the term of this patent is extended or adjusted under 35 U.S.C. 154(b) by 43 days.

(21) Appl. No.: 10/552,908

(22) PCT Filed: Apr. 13, 2004

(86) PCT No.: PCT/EP2004/050503

§ 371 (c)(1),
(2), (4) Date: Oct. 13, 2005

(87) PCT Pub. No.: WO2004/092244

PCT Pub. Date: Oct. 28, 2004

(65) Prior Publication Data

US 2007/0100114 A1 May 3, 2007

(30) Foreign Application Priority Data

Apr. 16, 2003 (CH) ..................................... 0697/03

(51) Int. Cl.
C08G 8/28 (2006.01)
C08G 59/68 (2006.01)
C08F 283/00 (2006.01)
C07D 293/00 (2006.01)
C07D 233/00 (2006.01)

(52) U.S. Cl. .................. 525/504; 525/523; 528/94; 548/100; 548/335.1

(58) Field of Classification Search .............. 548/100, 548/335.1; 525/504, 523; 528/94
See application file for complete search history.

(56) References Cited

U.S. PATENT DOCUMENTS

| 3,356,645 A | 12/1967 | Warren | |
|---|---|---|---|
| 4,101,514 A | 7/1978 | Thom | |
| 4,127,615 A * | 11/1978 | Zahir et al. | 525/502 |
| 4,487,914 A | 12/1984 | Barton | |
| 4,549,008 A | 10/1985 | Renner | |
| 4,649,181 A | 3/1987 | Darms | |
| 4,652,398 A * | 3/1987 | Goswami et al. | 252/514 |
| 4,666,954 A * | 5/1987 | Forgo et al. | 522/83 |
| 4,677,170 A | 6/1987 | Monnier | |
| 4,701,378 A * | 10/1987 | Bagga et al. | 428/414 |
| 5,001,212 A | 3/1991 | Hammer | |
| 5,298,649 A * | 3/1994 | Okita et al. | 560/56 |
| 5,591,811 A * | 1/1997 | Blyakhman | 525/504 |
| 5,922,448 A * | 7/1999 | Das et al. | 428/297.4 |
| 6,245,835 B1 * | 6/2001 | Klein et al. | 523/402 |

FOREIGN PATENT DOCUMENTS

EP 0761709 3/1997

* cited by examiner

Primary Examiner—Harold Y Pyon
Assistant Examiner—Megan McCulley

(57) ABSTRACT

Composition comprising as component A) a 1-imidazoly [mothyl-substituted 2-naphthol compound of the general formula (I) where $R_1$, $R_2$ and $R_3$ each independently of one another are H; $C_{1-17}$alkyl; $C_{3-12}$cycloalkyl, optionally substituted by $_{c1-4}$alkyl groups; $C4_{-20}$cycloalkyl-alkyl, optionally substituted by $C_{1-4}$alkyl groups; $C_{6-10}$aryl, optionally substituted by 1-3 $C_{1-4}$-alkyl groups; $C_{7-15}$.phonylalkyl, optionally substituted by 1-3 $C_{1-4}$alkyl groups; $C_{3-17}$alkenyl; $C_{3-12}$alkynyl; or aromatic or aliphatic $C_{3-12}$acyf; $R_4$, $R_5$, $R_6$, $R_7$, $R_8$, and $R_9$ each independently of one another are H; $C_{1-12}$alkyl; $C_{3-12}$cycloalkyl, optionally substituted by $C_{1-4}$alkyl groups; $C_{4-20}$cycloalkyl-alkyl, optionally substituted by $C_{1-4}$alkyf groups; $C_{6-10}$aryl, optionally substituted by 1-3 $C_{1-4}$alkyl groups; $C_{7-15}$phenylalkyl, optionally substituted by 1-3 $C_{1-4}$alkyl groups; $C_{3-17}$alkenyl; $C_{3-12}$alkynyl; $C_{1-12}$alkoxy; or OH; and as component B) a phenol which is liquid at room temperature, the weight ratio of component A) to component B) being from 10:90 to 80:20 as accelerator for curable epoxy resin compositions which are used as a compression moulding compound, sinter powder, encapsulating system, casting resin, or for producing prepregs and laminates having very good interlaminar shear strength values using impregnating methods or injection methods, for producing components, especially components of large surface area.

11 Claims, No Drawings

ACCELERATOR SYSTEMS FOR LOW-TEMPERATURE CURING

CROSS REFERENCE TO RELATED APPLICATIONS

This application is the National Phase of International Application PCT/EP2004/050503 filed Apr. 13, 2004 which designated the U.S. and which claims priority to Swiss Pat. App. No. 0697/03 filed Apr. 16, 2003. The noted applications are incorporated herein by reference.

The invention relates to novel Mannich bases based on modified 1-imidazolylmethyl-substituted 2-naphthol compounds and also to their use as accelerators for epoxy resin systems which allow high ILS values in laminates, particularly for Impregnation by the wet layup method and other impregnating methods. The accelerators described are additionally suitable for sinter powder, casting resin and compression moulding compound applications conducted at temperatures below 200° C., in particular in the temperature range 150° C. to 180° C.

The compound 1-imidazolylmethyl-2-naphthol and other imidazole catalysts and accelerators in connection with epoxy resins are known.

The customarily used Imidazoles such as imidazole, 1-methylimidazole, 2-methylimidazole, 2-ethyl-4-methylimidazole or else 2-phenylimidazoles, however, in many epoxy resin formulations produce inadequate storage stabilities of prepregs (standing times for short) at room temperature when they are employed in prepreg formulations.

In the past attempts have been made to solve this problem by looking to reduce the reactivity of the imidazoles by formation of salts with organic or inorganic acids: see U.S. Pat. Nos. 3,356,645 and 5,001,212, for example. Although improvements in the standing times were achieved in those cases, they are still not sufficient for many applications.

Another way of increasing the standing times is to form imidazole complexes by reacting imidazoles with metal salts: see U.S. Pat. Nos. 4,101,514 and 4,487,914, for example. Generally speaking, the improvement in the standing times that can be achieved in this way is obtained at the expense of an increase in the processing temperatures. Moreover, the metal complexes present in the cured epoxy resin system lead to a deterioration in the dielectric values and also to an increase in the water absorption. In many applications, however, it is required that there is no substantial change in water absorption, since otherwise the glass transition temperature may be lowered, which can lead to a considerable change in the mechanical, electrical and thermal properties of the impregnated component.

EP 0 761 709 describes 1-imidazolylmethyl-substituted 2-naphthol compounds as catalysts which make it possible substantially to avoid the disadvantages described in the above citations. The compounds in question are stable Mannich bases which in epoxy resin systems lead to a markedly improved standing time of the overall system at room temperature. A formulation comprising such a catalyst can be cured rapidly in the temperature range between 110° C. and 150° C. Materials of this kind exhibit good mechanical properties with relatively high glass transition ranges. Prepregs comprising such catalysts can be stored without problems for up to 16 days at room temperature and processed to laminates.

Established methods for producing favourably priced components of large surface area include the wet layup method and other impregnating methods. For reasons of cost, the aim is for temperatures below 100° C. during the impregnating operation. For reasons of greater ease of handling the semi-finished products manufactured in this way (prepregs) ought to have a relatively long storage stability at room temperature, which means that the prepreg must be capable of troublefree conversion to the laminate after storage for four days.

Where laminates produced in this way are employed in energy-producing installations, the laminates being subject to rotational movements and shear forces during their use, a certain minimum of adhesion is necessary between the individual layers which make up the laminate. One measure of this adhesion is that known as interlaminar shear strength, also called ILS for short, which is determined in accordance with the ASTM standard (ASTM D 2344-84). A maximum ILS value is therefore an aim for such applications.

It has now been found that 1-(imidazolyl-2-methyl)-2-naphthol does enable outstanding storage stabilities at room temperature in prepreg formulations but not very high interlaminar shear strength values. The maximum achievable value is approximately 22 MPa, irrespective of whether curing is carried out at 60° C. for four hours, at 75° C. for four hours, at 75° C. for eight hours or at 140° C. for 30 minutes.

It has now surprisingly also been found that certain compositions of 1-imidazolyl-2-methyl-substituted 2-naphthol compounds with phenols have a profile of properties which allows their advantageous use as accelerators for epoxy resin systems particularly in the context of the wet layup method and other impregnating methods. In particular it Is possible In this way to achieve increases in the ILS value of up to 50 MPa.

The invention accordingly first provides compositions comprising as component A) a 1-imidazolylmethyl-substituted 2-naphthol compound of the general formula (I)

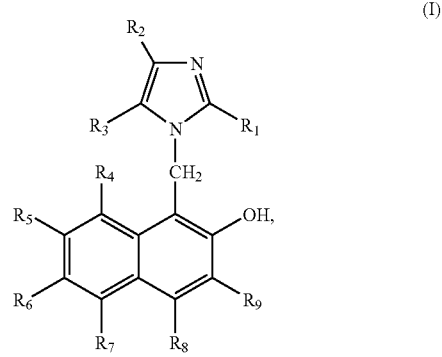

where
$R_1$, $R_2$ and $R_3$ each independently of one another are H; $C_{1-17}$alkyl;
$C_{3-12}$cycloalkyl, optionally substituted by $C_{1-4}$alkyl groups;
$C_{4-20}$cycloalkyl-alkyl, optionally substituted by $C_{1-4}$alkyl groups;
$C_{8-10}$aryl, optionally substituted by 1-3 $C_{1-4}$alkyl groups;
$C_{7-15}$phenylalkyl, optionally substituted by 1-3 $C_{1-4}$alkyl groups;
$C_{3-17}$alkenyl; $C_{3-12}$alkynyl; or aromatic or aliphatic $C_{3-12}$acyl;
$R_4$, $R_5$, $R_6$, $R_7$, $R_8$, and $R_9$ each independently of one another are H; $C_{1-12}$alkyl;
$C_{3-12}$cycloalkyl, optionally substituted by $C_{1-4}$alkyl groups;
$C_{4-20}$cycloalkyl-alkyl, optionally substituted by $C_{1-4}$alkyl groups;
$C_{8-10}$aryl, optionally substituted by 1-3 $C_{1-4}$alkyl groups;
$C_{7-15}$phenylalkyl, optionally substituted by 1-3 $C_{1-4}$alkyl groups;
$C_{3-17}$alkenyl; $C_{3-12}$alkynyl; $C_{1-12}$alkoxy; or OH; and as component B) a phenol which Is liquid at room temperature (RT=15 to 35° C.), the weight ratio (in % by weight) of component A) to component B) being from 10:90 to 80:20, preferably from 20:80 to 70:30, more preferably from 25:75 to 50:50.

As component A) preference is given to compounds of the general formula (I) for which the radicals $R_1$, $R_2$ and $R_3$ are each independently of one another H; $C_{1-12}$alkyl; phenyl; or $C_{7-15}$phenylalkyl, optionally substituted by 1-3 $C_{1-4}$alkyl groups;

particular preference is given to compounds where $R_2$ and $R_3$ are each H; and $R_1$ is $C_{1-12}$alkyl; phenyl; or $C_{7-15}$phenylalkyl, optionally substituted by 1-3 $C_{1-4}$alkyl groups.

Particular preference as component A) is given to compounds of the general formula (I) for which the radicals $R_2$ to $R_9$ are a hydrogen atom and the radical $R_1$ Is $C_{1-4}$alkyl (methyl, ethyl, As component B) it is preferred to use 1,4-n-pentyl-, -n-hexyl-, -n-heptyl-, -n-octyl-, n-nonyl-, and -n-decylphenol, and particular preference to using an O,O'-diallyl-bisphenol A.

The fraction of naphthol derivative ought preferably to be at least 20% by weight in the composition of components A) and B) in order to avoid substantial reductions in the glass transition range of the cured formulation as a result of the phenol.

To prepare the compositions of the invention first of all a 1-imidazolyimethyl-substituted 2-naphthol is prepared as described, for example, in EP 0 761 709. Then advantageously the desired phenol (component B) is introduced and the naphthol is added to it, and the mixture is stirred intimately at an elevated temperature of 160° C., for example, for from four to 6 hours. Depending on the choice of the components and of the chosen mixing ratio the products are viscous to high-viscosity liquids or solids. The nature of the composition obtained may also be described as a solid solution of the naphthol in the phenol. Where at least about 20% by weight of a phenol is added to the naphthols, the change in the profile of properties of the naphthol thus "modified" is already so significant that compositions of this kind have a profile of properties which Is sufficient for advantageous use In prepregs. Compositions which have been found to be particularly advantageous are those having a slight to marked excess (in % by weight) of phenol.

As mentioned at the outset, the compositions of the invention are suitable as accelerators for curable epoxy resin systems.

The invention therefore further provides curable epoxy resin compositions comprising
a) an epoxy resin whose epoxide content is from 0.1 to 11, preferably from 0.1 to 2.2, epoxide equivalents/kg,
b) a composition comprising as component A) a 1-imidazolyimethyl-substituted 2-naphthol compound of the above general formula (I) and as component B) a phenol which is liquid at room temperature (RT=15 to 35° C.) such as, for example, n-pentyl-, n-hexyl-, n-heptyl-, n-octyl-, n-nonyl-, n-decylphenol, in particular an O,O'-diallyl-bisphenol A, the weight ratio (% by weight) of component A) to component B) being from 10:90 to 80:20, preferably from 20:80 to 70:30, more preferably from 25:75 to 50:50,
c) a curing agent for the epoxy resin, and optionally
d) an additive customary In epoxy resin technology.

In principle all epoxy resins are suitable as component (a).
Suitable examples include diglycidyl or polyglycidyl ethers of cycloaliphatic polyols, such as 2,2-bis(4'-hydroxycyclohexyl)propane, diglycidyl or polyglycidyl ethers of polyhydric phenols, such as resorcinol, bis(4'-hydroxyphenyl)methane (bisphenol F), 2,2bis(4'-hydroxyphenyl)-propane (bisphenol A), 2,2-bis(4'-hydroxy-3',5'-dibromophenyl)propane, 1,1,2,2-tetrakis(4'-hydroxyphenyl)ethane, or condensation products of phenols with formaldehyde, such as phenol novolaks and cresol novolaks; additionally, di- or poly($\beta$-methylglycidyl) ethers of the above-cited polyalcohols and polyphenols; polyglycidyl esters and poly($\beta$-methylglycidyl) esters of polybasic carboxylic adds such as phthalic acid, terephthalic acid, tetrahydrophthalic and hexahydrophthalic acid; glycidyl derivatives of aminophenols, such as triglycidyl-p-aminophenol; N-glycidyl derivatives of amines, amides and heterocyclic nitrogen bases, such as N,N-diglycidylaniline, N,N-diglycidyltoluidine, N,N,N', N'-tetraglycidyl-bis(4-aminophenyl)methane, triglycidyl isocyanurate, N,N-diglycidyl-N,N'-ethyleneurea, N,N'-diglycidyl-5,5-dimethylhydantoin, N,N'-diglycidyl-5-isopropylhydantoin, N,N'-diglycidyl-5,5-dimethyl-6-isopropyl-5,6-dihydrouracil; polyfunctional epoxy resins, such as the 2,6-disubstituted 4-epoxypropylphenyl glycidyl ethers and adducts thereof that are described in EP-A 205 409 and EP-A 204659; bisphenols such substituted with in each case two glycidyloxy groups and 2,3-epoxypropyl groups, such as the 2,2-bis(3'-epoxypropyl-4'-epoxypropylphenyl)propane described in GB 828364; glycidyl derivatives of tetramethylol-substituted cyclohexanols, cyclohexanones, cyclopentanols and cyclopentanones, such as the compounds described in U.S. Pat. No. 4,549,008; glycidyloxy-substituted benzophenones; and glycidyloxydiketones, such as the compounds described in U.S. Pat. No. 4,649,181.

In general it is also possible to use mixtures of two or more epoxy resins as components in the formulations of the invention.

Suitable epoxy resins include preferably glycidyl ethers such as bisphenol A or F, glycidyl esters, N-glycidyl and N,O-glycidyl derivatives of aromatic or heterocyclic compounds, and also cycloaliphatic glycidyl compounds. They preferably have a functionality of from 0.1 to 2.2 epoxide equivalents/kg.

As curing agents, or component (c), it is possible in principle to use all of the curing agents which are customary in epoxy resin chemistry, such as amines, dicyandiamide, cyanoguanidines, melamines, novolaks, including cresol-novolaks, polyols and anhydrides, for example As curing agent it is preferred to use amines and polyamines, examples being those of the Jeffamine type, and others. Examples that may be mentioned include o-, m-, and p-phenylenediamine; diaminotoluenes, such as 2,4-diaminotoluene, 1,4-diamino-2-methoxy-benzene, 2,5-diaminoxylene, 1,3-diamino-4-chlorobenzene, 4,4'-diaminodiphenylmethane, 4,4'-diaminodiphenyl ether, 4,4'-diaminodiphenyl thioether, 4,4'-diaminodiphenyl sulfone, 2,2'-diaminobenzophenone, 1,8- or 1,5-diaminonaphthalene, 2,6-diaminopyridine, 1,4-piperazine, 2,4-diaminopyrimidine, 2,4-diamino-s-triazine, di-, tri-, tetra, hexa-, hepta-, octa-, and decamethylenediamine, 3-methylheptamethylene-1,6-diamine, 3-methoxyhexamethylenediamine, 2,11-diaminododecane, 2,2,4- and 2,4,4-trimethylhexamethylene-diamine, 1,2-bis(3-aminopropoxy)ethane, N,N'-dimethylethylenediamine, N,N'-dimethyl-1,6-diaminohexane and also the diamines of the formulae $H_2N(CH_2)_3O(CH_2)_2O(CH_2)_3$—$NH_2$ and $H_2N(CH_2)_3S(CH_2)_3NH_2$, 1,4-diaminocyclohexane, 1,4-bis(2-methyl-4-aminopentyl)benzene, 1,4-bis(aminomethyl)benzene.

Additionally suitable amines are carbocyclic-aromatic diamines, especially substituted dinuclear diamines, such as bis(3,5-diisopropyl-4-aminophenyl)methane, bis(2-chloro-3,5-diethyl-4-aminophenyl)methane, bis(3-ethyl-4-amino- 5-sec-butylphenyl)methane, bis(2-chloro-3,5-diethyl-4-aminophenyl)methane and bis(3,5-diethyl-4-aminophenyl) methane, for example.

Additionally suitable are propane-1,3-diamine, m-xylenediamine, bis(4-aminocyclohexyl)-propane, 3-aminomethyl-3,5,5-trimethylcyclohexylamine (isophoronediamine), polyaminoamides, examples being those consisting of aliphatic polyamines and dimerized or trimerized fatty acids; polyphenols, such as resorcinol, hydroquinone, bisphenol A and phenol/aldehyde resins, and also polythiols such as 'Thiokols' for example.

Particular preference is given to diamines or polyamines, amino-terminated polyalkylene glycols and polyoxypropylenediamines (e.g. Jeffamines, in this case Jeffamine D 230, amino-poly-THF) or polyaminoamides, especially dimers or copolymers of propylene glycol and ethylene glycol, amino-terminated polybutadienes with molecular weights in the range from about 150 to 5000, in particular from 200 to 600.

As optional component d) it is possible to use additives customary in epoxy resin technology. By these are meant the customary auxiliaries and additives which are known to and used by the person skilled in the art in respect of the particular application. Examples include organic To prepare the curable compositions of the invention it is possible for the accelerators of the invention to be dissolved beforehand in the curing agent, at generally elevated temperatures: for example, when using a Jeffamine, at about 80° C. Solutions of this kind can be cooled to 40° C. and then mixed with the epoxy resin. These mixtures can then be used directly as impregnating solutions. Another possibility is to disperse the compositions of the invention homogeneously in the epoxy resin beforehand, by means for example of suitable stirrers, such as an Ultra-Turrax or a triple roll mill.

The compounds of the invention are used advantageously at from 5 to 40 parts by weight, preferably from 5 to 30 parts by weight, based on the overall formulation comprising epoxy resin, curing agent, accelerator and, where used, additives. It is particularly advantageous to use from 5 to 20 parts by weight The curing agents are employed in the customary amounts, which are therefore to be calculated such that on average per epoxide group there are from 0.5 to 1.5, preferably from 0.8 to 1.2, functional groups of the curing agent Auxiliaries and additives can be used in principle in wide quantity ranges, provided that this is possible without a significant increase in the viscosity of the desired compositions.

Prepregs comprising Inventive accelerator systems of this kind have the capacity to give an ILS value of up 50 MPa. Accordingly the accelerators of the invention are particularly suitable for use in epoxy resin formulations which are employed as compression moulding compounds, sinter powders, encapsulating systems, casting resins and for producing prepregs and laminates by the wet layup method and injection methods, especially for producing components of large surface area.

EXPERIMENTAL SECTION a) Preparation of a Composition Comprising Naphthol Component and Phenol Component The phenol component is charged to a vessel and then the naphthol component is added. The amounts used can be seen from Table 1 below. The mixture is stirred at 160° C. for 4 hours. This gives viscous to high-viscosity liquids of dark red to black coloration or solids.

TABLE 1

|  | Experiment | | | |
|---|---|---|---|---|
|  | 1 | 2 | 3 | 4 |
| Naphthol[1] [% by weight] | 10 | 30 | 50 | 70 |
| Phenol[2] [% by weight] | 90 | 70 | 50 | 30 |
| State | liquid | liquid | solid | solid |
| Viscosity $\eta_{60°\,C.}$ [Pa·s] | ng[3] | 28 | 6000 | nm[3] |

[1] 1-Imidazolymethyl-2-naphthol from Vantico AG;
[2] Diallylbisphenol A (from Vantico AG);
[3] ng = not measured, nm = not measurable at 60° C., viscosity determined with Rheometrix RD2 with a plate/plate setup b) Use Examples of the Accelerator Formulations of the Invention The products from the above experimental section a) are dissolved at temperatures between 60° C. and 80° C. in the amine curing agent (in this case Jeffamine® D-230). This gives dark brown clear solutions. After cooling to room temperature, this solution is admixed with the calculated amount of epoxy resin. For details see Table 2 below:

TABLE 2

|  | Experiment | |
|---|---|---|
|  | Comparison | 5 |
| Composition: | | |
| LY 556[1] | 100 | 100 |
| Amine[2] | 10 | 10 |
| Accelerator[3] | 10 |  |
| E2[4] |  | 11.7 |
| Prepregs and laminates: | | |
| Preparation[5] | 8 | 4 |
| Prepreg[6] | 12 | 12 |
| Resin content[7] | 40-42 | 40-42 |
| Storage[8] | RT | RT |
| ILS value a) | | |
| $F_{max}$ [N][9] | 601 +/− 38 | 562 +/− 31 |
| $\Sigma_{max}$ [MPa][10] | 22.6+/−1.4 | 14.1+/−0.7 |
| ILS value b) | | |
| $F_{max}$ [N] | 426 +/− 37 | 10501 +/− 40 |
| $\Sigma_{max}$ [MPa] | 16.0+/−1.4 | 52.4+/−1.5 |
| ILS value c) | | |
| $F_{max}$ [N] | 400 +/− 33 | 1096 +/− 51 |
| $\Sigma_{max}$ [MPa] | 16.0+/−1.3 | 42.0+/−2.0 |
| ILS value d) | | |
| $F_{max}$ [N] | nm | 1256+/− 22 |
| $\sigma_{max}$ [MPa] | nm | 46.2+/−1.1 |

[1] Araldite LY 556 Bisphenol A resin (Vantico AG)
[2] Amine Jeffamine ® D-230
[3] Accelerator 1-Imidazolymethyl-2-naphthol (Vantico AG)
[4] E2 Experiment 2 (see table 1)
[5] Preparation Preparation of the prepregs and laminates after number of days
[6] Prepreg Number of plies = 12
[7] Resin content Resin content in per cent after the laminates have been pressed
[8] Storage At 20° C. to 25° C. = RT
[9] $F_{max}$ Ultimate strength (breaking load) to ASTM D 2344
[10] $\sigma_{max}$ Shear strength to ASTM D 2344
ILS value a) Interlaminar shear strength (ILS) after 30 min at 140° C.
ILS value b) Interlaminar shear strength (ILS) after 4 h at 75° C.
ILS value c) Interlaminar shear strength (ILS) after 8 h at 75° C.
ILS value d) Interlaminar shear strength (ILS) after 4 h at 60° C.

Surprising are the very good interlaminar shear strengths which can be obtained with the accelerators of the invention in the lower temperature range (60° C.-75° C./4-8 hours). The values found are substantially higher than in the case of the comparison system.

The invention claimed is:

1. Composition comprising as component A) a 1-imidazolylmethyl-substituted 2-naphthol compound of the general formula (I)

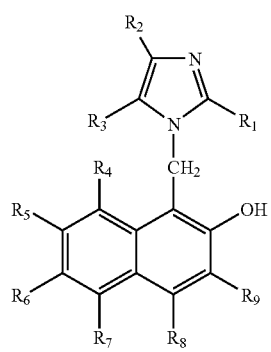

(I)

where $R_1$, $R_2$, and $R_3$ each independently of one another are H; $C_{1-17}$ alkyl; $C_{3-12}$ cycloalkyl, optionally substituted by $C_{1-4}$ alkyl groups; $C_{4-20}$ cycloalkyl-alkyl, optionally substituted by $C_{1-4}$ alkyl groups; $C_{6-10}$ aryl, optionally substituted by 1-3 $C_{1-4}$ alkyl groups; $C_{7-15}$ phenylalkyl, optionally substituted by 1-3 $C_{1-4}$ alkyl groups; $C_{3-17}$ alkenyl; $C_{3-12}$ alkynyl; or aromatic or aliphatic $C_{3-12}$ acyl;

$R_4$, $R_5$, $R_6$, $R_7$, $R_8$ and $R_9$ each independently of one another are H; $C_{1-12}$ alkyl; $C_{3-12}$ cycloalkyl, optionally substituted by $C_{1-4}$ alkyl groups; $C_{4-20}$ cycloalkyl-alkyl, optionally substituted by $C_{1-4}$ alkyl groups; $C_{6-10}$ aryl, optionally substituted by 1-3 $C_{1-4}$ alkyl groups; $C_{7-15}$ phenylalkyl, optionally substituted by 1-3 $C_{1-4}$ alkyl groups; $C_{3-17}$ alkenyl; $C_{3-12}$ alkynyl; $C_{1-12}$ alkoxy; or OH; and as component B) a phenol selected from the group consisting of 1,4-n-pentylphenol, n-hexylphenol, n-heptylphenol, n-octyphenol, n-decylphenol, and O,O'-diallyl-bisphenol A which is liquid at room temperature, with a weight ratio of component A) to component B) being from 30:70 to 70:30 and wherein the composition is a liquid.

2. Composition according to claim 1, wherein $R_1$, $R_2$ and $R_3$ each independently of one another are H; $C_{1-12}$ alkyl; phenyl; or $C_{7-15}$ phenylalkyl, optionally substituted by 1-3 $C_{1-4}$ alkyl groups.

3. Composition according to claim 2, wherein $R_2$ and $R_3$ are each H; and $R_1$ is $C_{1-12}$ alkyl; phenyl; or $C_{7-15}$ phenylalkyl, optionally substituted by 1- 3 $C_{1-4}$ alkyl groups.

4. Composition according to claim 3, wherein $R_{2-9}$ are a hydrogen atom and $R_1$ is $C_{1-4}$ alkyl, or phenyl, optionally substituted by 1-3 $C_{1-4}$ alkyl groups.

5. Composition according to claim 1, wherein component B) is O,O'-diallyl-bisphenol A.

6. Curable composition comprising;

a) an epoxy resin whose epoxide content is from 0.1 to 11 epoxide equivalents/kg;

b) from 5 to 40 parts by weight, based on the total weight of the curable composition, a liquid composition comprising a 1-imidazolylmethyl-substituted 2-naphthol compound of the general formula (I)

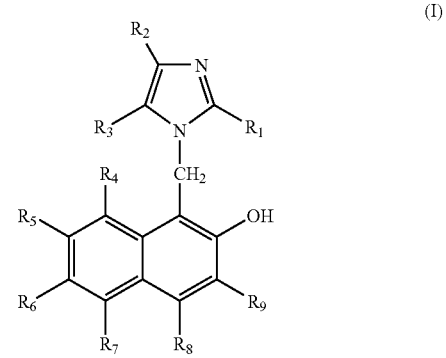

(I)

where $R_1$, $R_2$, and $R_3$ each independently of one another are H; $C_{1-17}$ alkyl; $C_{3-12}$ cycloalkyl, optionally substituted by $C_{1-4}$ alkyl groups; $C_{4-20}$ cycloalkyl-alkyl, optionally substituted by $C_{1-4}$ alkyl groups; $C_{6-10}$ aryl, optionally substituted by 1-3 $C_{1-4}$ alkyl groups; $C_{7-15}$ phenylalkyl, optionally substituted by 1-3 $C_{1-4}$ alkyl groups; $C_{3-17}$ alkenyl; $C_{3-12}$ alkynyl; or aromatic or aliphatic $C_{3-12}$ acyl;

$R_4$, $R_5$, $R_6$, $R_7$, $R_8$ and $R_9$ each independently of one another are H; $C_{1-12}$ alkyl; $C_{3-12}$ cycloalkyl, optionally substituted by $C_{1-4}$ alkyl groups; $C_{4-20}$ cycloalkyl-alkyl, optionally substituted by $C_{1-4}$ alkyl groups; $C_{6-10}$ aryl, optionally substituted by 1-3 $C_{1-4}$ alkyl groups; $C_{7-15}$ phenylalkyl, optionally substituted by 1-3 $C_{1-4}$ alkyl groups; $C_{3-17}$ alkenyl; $C_{3-12}$ alkynyl; $C_{1-12}$ alkoxy; or OH; and a phenol selected from the group consisting of 1,4-n-pentylphenol, n-hexylphenol, n-heptylphenol, n-octyphenol, n-decylphenol, and O,O'-diallyl-bisphenol A which is liquid at room temperature, the weight ratio of the 1-imidazolylmethyl- substituted 2-naphthol compound to phenol being from 30:70:70:30;

c) a curing agent for the epoxy resin having from 0.5 to 1.5 functional groups per epoxide group; and optionally d) one or more additives.

7. Composition according to claim 6, wherein the curing agent is an amine or polyamine.

8. Composition according to claim 7, characterized in that the curing agent is a polyoxypropylenediamine.

9. Composition according to claim 6, characterized in that the epoxy resin is a glycidyl ether, glycidyl ester, N-glycidyl or N,O-glycidyl derivative of an aromatic or heterocyclic compound, or a cycloaliphatic glycidyl compound.

10. A prepreg comprising a curable composition according to claim 6.

11. A method for making a curable composition comprising adding to an epoxy resin a curing agent, a liquid composition comprising a 1-imidazolylmethyl-substituted 2-naphthol compound of the general formula (I)

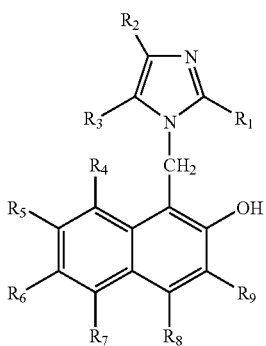

where
R₁, R₂, and R₃ each independently of one another are H; $C_{1-17}$ alkyl; $C_{3-12}$ cycloalkyl, optionally substituted by $C_{1-4}$ alkyl groups; $C_{4-20}$ cycloalkyl-alkyl, optionally substituted by $C_{1-4}$ alkyl groups; $C_{6-10}$ aryl, optionally substituted by 1-3 $C_{1-4}$ alkyl groups; $C_{7-15}$ phenylalkyl, optionally substituted by 1-3 $C_{1-4}$ alkyl groups; $C_{3-17}$ alkenyl; $C_{3-12}$ alkynyl; or aromatic or aliphatic $C_{3-12}$ acyl;

R₄, R₅, R₆, R₇, R₈ and R₉ each independently of one another are H; $C_{1-12}$ alkyl; $C_{3-12}$ cycloalkyl, optionally substituted by $C_{1-4}$ alkyl groups; $C_{4-20}$ cycloalkyl-alkyl, optionally substituted by $C_{1-4}$ alkyl groups; $C_{6-10}$ aryl, optionally substituted by 1-3 $C_{1-4}$ alkyl groups; $C_{7-15}$ phenylalkyl, optionally substituted by 1-3 $C_{1-4}$ alkyl groups; $C_{3-17}$ alkenyl; $C_{3-12}$ alkynyl; $C_{1-12}$ alkoxy; or OH; and a phenol selected from the group consisting of 1,4-n-pentylphenol, n-hexylphenol, n-heptylphenol, n-octyphenol, n-decylphenol, and O,O'-diallyl-bisphenol A which is liquid at room temperature, the weight ratio of the 1-imidazolylmethyl-substituted 2-naphthol compound to phenol being from 30:70 to 70:30.

* * * * *